United States Patent
Kupratis

(10) Patent No.: US 10,072,570 B2
(45) Date of Patent: Sep. 11, 2018

(54) REVERSE FLOW GAS TURBINE ENGINE CORE

(71) Applicant: United Technologies Corporation, Hartford, CT (US)

(72) Inventor: Daniel Bernard Kupratis, Wallingford, CT (US)

(73) Assignee: United Technologies Corporation, Farmington, CT (US)

( * ) Notice: Subject to any disclaimer, the term of this patent is extended or adjusted under 35 U.S.C. 154(b) by 609 days.

(21) Appl. No.: 14/651,801

(22) PCT Filed: Jan. 28, 2013

(86) PCT No.: PCT/US2013/023361
§ 371 (c)(1),
(2) Date: Jun. 12, 2015

(87) PCT Pub. No.: WO2014/116242
PCT Pub. Date: Jul. 31, 2014

(65) Prior Publication Data
US 2015/0322855 A1    Nov. 12, 2015

(51) Int. Cl.
*F02C 3/06* (2006.01)
*F01D 1/04* (2006.01)
(Continued)

(52) U.S. Cl.
CPC .................. *F02C 3/06* (2013.01); *F01D 1/04* (2013.01); *F02C 3/145* (2013.01); *F02K 1/78* (2013.01); *F02K 3/075* (2013.01); *F05D 2250/31* (2013.01)

(58) Field of Classification Search
CPC .... F02C 3/06; F02C 3/145; F01D 1/00; F01D 1/04; F01D 1/06; F01D 1/08; F02K 1/00;
(Continued)

(56) References Cited

U.S. PATENT DOCUMENTS 7,237,378 B2 *  7/2007  Lardellier ................. F02K 1/48
                                                          60/226.1
7,802,431 B2     9/2010  Parker
(Continued)

OTHER PUBLICATIONS

The International Search Report and Written Opinion for PCT Application No. PCT/US2013/023361, dated Sep. 27, 2013.
(Continued)

*Primary Examiner* — Phutthiwat Wongwian
*Assistant Examiner* — Loren Edwards
(74) *Attorney, Agent, or Firm* — Carlson, Gaskey & Olds, P.C.

(57) ABSTRACT

A gas turbine engine has a fan rotor for delivering air into a bypass duct and into a core airflow duct. Air in the core flow duct passes axially downstream from the fan and past a reverse core engine including a turbine section, a combustor section, and a compressor section. The core airflow duct reaches a turning duct which turns the airflow radially inwardly to communicate with an inlet for the compressor section. Air in the compressor section passes to the combustor section. Products of the combustion pass downstream across a turbine rotor. An exhaust turning duct communicates products of the combustion from a full cylindrical portion downstream of the turbine rotor through a plurality of circumferentially separated mixing lobe outlets to mix with the bypass air in the bypass duct. The bypass duct extends past the mixing lobe outlets, and is defined circumferentially intermediate the mixing lobe outlets.

6 Claims, 3 Drawing Sheets

(51) Int. Cl.
*F02K 1/78* (2006.01)
*F02K 3/075* (2006.01)
*F02C 3/14* (2006.01)

(58) Field of Classification Search
CPC ..... F02K 1/78; F02K 3/02; F02K 3/04; F02K 3/075; F02K 3/077; F05D 2250/31
USPC .............................. 60/805, 262, 226.1, 226.3
See application file for complete search history.

(56) References Cited

U.S. PATENT DOCUMENTS

| | | | |
|---|---|---|---|
| 8,176,725 B2* | 5/2012 | Norris | F02C 3/107 60/226.1 |
| 8,371,806 B2* | 2/2013 | Kupratis | F02K 1/085 415/145 |
| 2005/0060983 A1 | 3/2005 | Lardellier | |
| 2008/0219843 A1 | 9/2008 | Matheny | |
| 2009/0092480 A1 | 4/2009 | Kupratis | |
| 2009/0226297 A1 | 9/2009 | Yanagi et al. | |
| 2010/0050650 A1 | 3/2010 | Patel et al. | |
| 2011/0056208 A1 | 4/2011 | Norris et al. | |

OTHER PUBLICATIONS

International Preliminary Report on Patentability for International Application No. PCT/US2013/023361 dated Aug. 6, 2015.

* cited by examiner

REVERSE FLOW GAS TURBINE ENGINE CORE

BACKGROUND OF THE INVENTION

This application relates to a gas turbine engine having a reverse flow core engine and mixing structure for mixing products of the combustion into the exhaust of the engine Gas turbine engines are known, and will typically include a fan delivering air into a compressor, where the air is compressed. This compressed air passes downstream into a combustion section where it is mixed with fuel and ignited. Products of this combustion pass downstream over turbine rotors, driving them to rotate. The turbine rotors drive the fan and compressor rotors.

Historically, from a front end of the engine to a rear end, the components have been aligned with the fan, then the compressor, then the combustor section and then the turbine section. Recently, it has been proposed that the components be arranged such that the air from the fan is delivered into the compressor at a location axially inward of the turbine and the combustor. The air then flows back through the compressor, into the combustor, across the turbine sections, and then radially outwardly to mix with bypass airflow. This arrangement has certain beneficial characteristics compared to the historic arrangement of the gas turbine engine.

SUMMARY OF THE INVENTION

In a featured embodiment, a gas turbine engine has a fan rotor for delivering air into a bypass duct and into a core airflow duct. Air in the core airflow duct passes axially downstream from the fan and past a reverse core engine including, serially, a turbine section, a combustor section, and a compressor section, The core airflow duct reaches a turning duct which turns the airflow radially inwardly to communicate with an inlet for the compressor section. Air in the compressor passes to the combustor section, and then products of the combustion pass downstream across a turbine rotor. An exhaust turning duct communicates products of the combustion from a downstream portion of the turbine rotor through a plurality of circumferentially separated mixing lobe outlets, to mix with the bypass air in the bypass duct. The bypass duct has portions defined circumferentially intermediate the mixing lobe outlets.

In another embodiment according to the previous embodiment, the mixing lobe outlets are connected to the downstream portion of the turning exhaust duct through vanes which communicate the products of combustion radially outwardly through the core airflow duct, which is radially inward of the bypass duct.

In another embodiment according to any of the previous embodiments, the core airflow duct is radially outward of the bypass air duct in an upstream location. There is a change-over arrangement, whereby the core airflow duct is positioned radially inward of the bypass duct in a downstream location.

In another embodiment according to any of the previous embodiments, the mixing lobe outlets mix the products of combustion with the bypass air upstream of the change-over arrangement.

In another embodiment according to any of the previous embodiments, the turbine rotor drives a shaft which in turn drives the fan rotor.

In another embodiment according to any of the previous embodiments, a third stream door is provided for selective opening to divert a portion of the air in the core airflow duct to an exhaust for the engine to provide additional propulsion.

In another embodiment according to any of the previous embodiments, the downstream portion receives products of combustion over 360 degrees about a center axis of the engine.

These and other features may be best understood from the following specification and drawings, the following which is a brief description.

DETAILED DESCRIPTION

Figure 1:
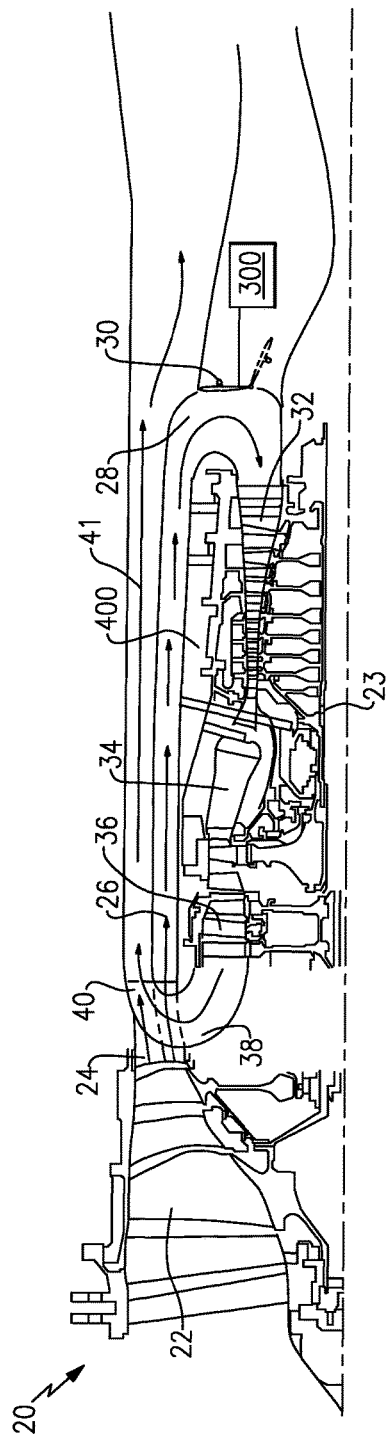
FIG. 1 shows a gas turbine engine.

FIG. 1 shows an engine 20 having a fan 22 driven to rotate by a shaft 23. The fan 22 delivers bypass air into bypass duct 24, and delivers core air into a core conduit 26. The core conduit 26 extends rearwardly through the engine to a turning duct 28, at a rear end of a compressor section 32. In this area, core flow is in the same direction as free stream flow. That is, downstream core flow is in same direction as the downstream flow for the free stream. The turning duct 28 turns the core airflow 26 into the compressor section 32 where it is compressed. In this area, core flow opposes free stream flow. That is, downstream core flow is in same direction as upstream flow for the free stream, and vice versa. This compressed air is delivered into a combustor 34 where it is mixed with fuel and ignited. Products of this combustion pass downstream over turbine rotors 36, driving them to rotate. The turbine rotors 36 drive the shaft 23 to in turn drive the fan rotor 22 and compressor rotors in compressor section 32.

A turning exhaust duct 38 communicates the products of combustion radially outwardly into mixing lobe outlets 40. At this location, core flow is again in the same direction as free stream flow. The products of combustion downstream of the mixing lobe outlets 40 mix with the bypass air 24, and form a mixed flow exhaust stream 41.

Figure 2:
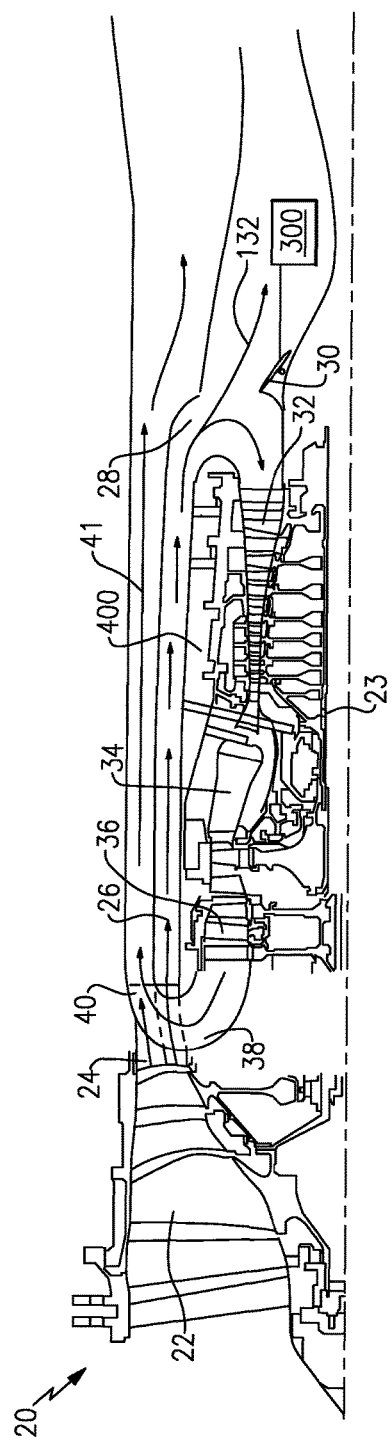
FIG. 2 shows the FIG. 1 engine with a third exhaust stream actuated.

A door 30 can provide an additional propulsion air, when opened. However, the door 30 is shown in a closed position in FIG. 1. It is known that increasing amounts of the propulsion for a gas turbine engine are provided by the bypass airflow, such as airflow 41. FIG. 2 shows the door 30 having been open to create additional exhaust air 132, albeit with a lower percentage of combustion product, which will provide additional propulsion for an aircraft associated with the engine 20.

A designer of gas turbine engines will know when it would be desirable to have additional propulsion, compared to additional air delivered into the core engine 400 defined by compressor 32, combustor 34, and turbine 36. A designer of gas turbine engines would be able to balance achieving optimum thrust by additional proportion, compared to the impact of decreasing airflow to the compressor section 32, as this will limit the amount of combustion occurring at combustor 34. This will assist in determining when the door 30 should be opened to provide additional propulsion.

Figure 3:
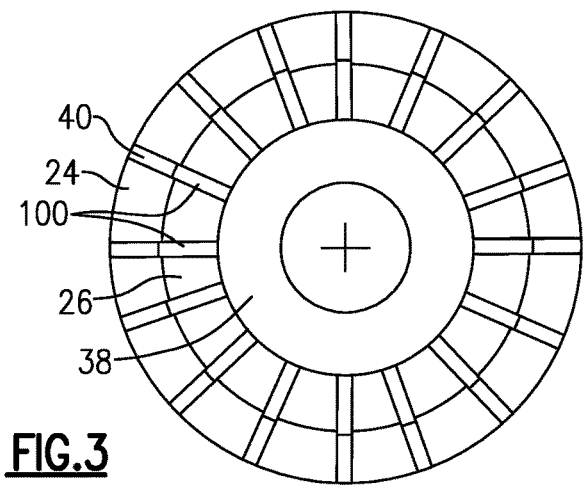
FIG. 3 is a cross sectional view schematically showing flow communication.

As shown in FIG. 3, the turning exhaust duct 32 communicates air into exit vanes 100, which communicates the airflow radially outwardly to mixing lobe outlets 40. The mixing lobe outlets 40 are circumferentially spaced from portions 24 of the bypass air. Thus, the air is communicated from a full portion 38 that extends over 360 degrees about a center of the engine through circumferentially spaced vanes 100 into the mixing lobe outlets 40.

Figure 4:
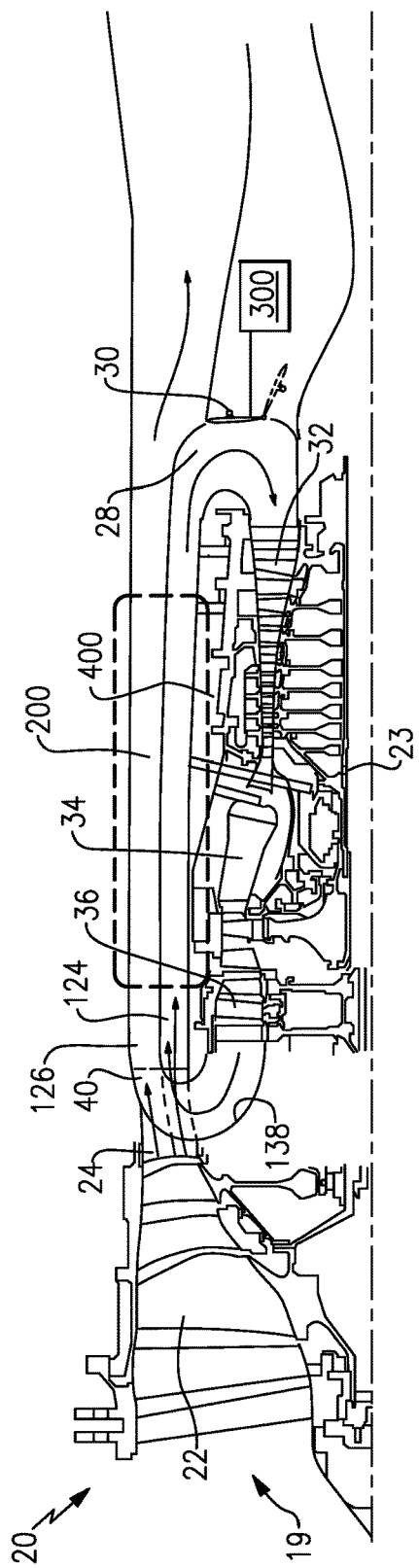
FIG. 4 shows a second embodiment.

FIG. 4 shows an alternative embodiment. In FIG. 4, the turning exhaust duct 138 delivers the products of combustion through a mixer into the bypass duct 124. As illustrated, the core airflow 126 is initially radially outward of the bypass duct 124.

Figure 5:
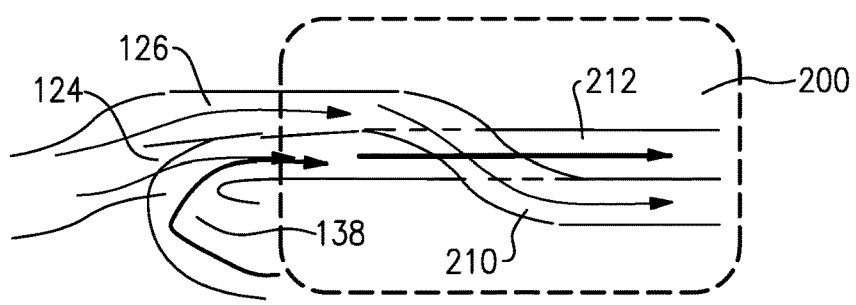
FIG. 5 shows a detail of the second embodiment.

A change-over arrangement 200 (shown in FIG. 5) changes the radial location of the flows 124 and 126 such that the flow reaching the inlet 28 has moved radially inwardly of the bypass flow. The arrangement 200 is shown in FIG. 5 which shows a core inlet 126 having a duct portion 210 which moves radially inward of the duct portion 212 which is carrying the bypass air.

Figure 6:
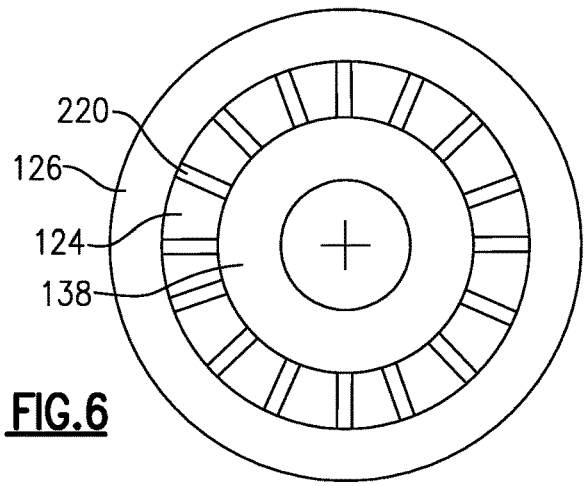
FIG. 6 schematically shows the flow in the second embodiment.

FIG. 6 shows the flow arrangement upstream of the change-over arrangement 200. Again, the exhaust turn duct 138 communicates with a plurality of vanes 220. However, vanes 220 empty into the bypass duct 124 at a location radially inward of the core airflow 126.

The engine 19 shown in FIG. 4 is also provided with a door 30 which can be selectively opened as in the FIG. 1 embodiment.

FIGS. 1 and 4 show the control 300, schematically, which controls the opening and closing of the door 30.

When this application states that flow is "over 360 degrees about a center of the engine," it should be recognized that there may be struts or other local obstruction. However, the flow does generally occur over 360 degrees about the center axis.

For purposes of this application, the terms "upstream" and "downstream" refer to the direction of the stream flow of air, where upstream is proximate to an inlet and downstream is distal therefrom.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
   a fan rotor for delivering air into a bypass duct and into a core airflow duct, air in the core airflow duct passing axially downstream from the fan and past a reverse core engine including, serially, a turbine section, a combustor section, and a compressor section,
   said core airflow duct reaching a turning duct which turns the airflow radially inwardly to communicate with an inlet for the compressor section, air in the compressor passing to the combustor section, and then products of the combustion passing downstream across a turbine rotor;
   an exhaust turning duct for communicating products of the combustion from a downstream portion of the turbine rotor through a plurality of circumferentially separated mixing lobe outlets, to mix with the bypass air in the bypass duct, with the bypass duct having portions defined circumferentially intermediate the mixing lobe outlets; and
   a door configured for selective opening to divert a portion of the air in the core airflow duct to an exhaust for the engine to provide additional propulsion.

2. The gas turbine engine as set forth in claim 1, wherein said mixing lobe outlets are connected to said downstream portion of said turning exhaust duct through vanes which communicate the products of combustion radially outwardly through said core airflow duct, which is radially inward of said bypass duct.

3. The gas turbine engine as set forth in claim 1, wherein said core airflow duct is radially outward of said bypass duct in an upstream location, and there being a change-over arrangement, whereby said core airflow duct is positioned radially inward of said bypass duct in a downstream location.

4. The gas turbine engine as set forth in claim 3, wherein said mixing lobe outlets mix the products of combustion with the bypass air upstream of the change-over arrangement.

5. The gas turbine engine as set forth in claim 1, wherein said turbine rotor drives a shaft which in turn drives said fan rotor.

6. The gas turbine engine as set forth in claim 1, wherein said downstream portion receives products of combustion over 360 degrees about a center axis of the engine.

* * * * *